United States Patent
MacFarlane et al.

(10) Patent No.: US 6,735,954 B2
(45) Date of Patent: May 18, 2004

(54) OFFSET DRIVE FOR GAS TURBINE ENGINE

(75) Inventors: Ian Alexander MacFarlane, St. Bruno (CA); Zenon Szlanta, Brossard (CA); Lazar Mitrovic, Longueuil (CA); Keith Martin Morgan, Montreal (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 10/026,844

(22) Filed: Dec. 21, 2001

(65) Prior Publication Data

US 2003/0115885 A1 Jun. 26, 2003

(51) Int. Cl.$^7$ ................................................ F02C 9/00
(52) U.S. Cl. ..................................................... 60/793
(58) Field of Search ........................ 60/793; 74/DIG. 5

(56) References Cited

U.S. PATENT DOCUMENTS

| | | |
|---|---|---|
| 2,540,991 A | 2/1951 | Price |
| 2,563,744 A | 8/1951 | Price |
| 2,874,585 A * | 2/1959 | Lasley ........................ 74/336.5 |
| 3,008,296 A * | 11/1961 | Clark ........................... 415/18 |
| 3,025,025 A | 3/1962 | Duttmann |
| 3,680,309 A | 8/1972 | Wallace, Jr. |
| 3,792,586 A | 2/1974 | Kasmarik et al. |
| 3,958,655 A | 5/1976 | Kronogard |
| 4,118,997 A | 10/1978 | Woodward et al. |
| 4,183,207 A | 1/1980 | Libertini |
| 4,270,408 A | 6/1981 | Wagner |
| 4,478,551 A | 10/1984 | Honeycutt, Jr. et al. |
| 4,525,995 A | 7/1985 | Clark |
| 4,683,714 A | 8/1987 | Thebert |
| 4,756,664 A | 7/1988 | Cohen et al. |
| 4,776,163 A | 10/1988 | Brockmann |
| 4,825,645 A | 5/1989 | Bell, III |
| 4,972,671 A | 11/1990 | Asselin et al. |
| 5,103,631 A | 4/1992 | Edwards et al. |
| 5,320,305 A | 6/1994 | Oatway et al. |
| 5,694,765 A | 12/1997 | Hield et al. |
| 6,041,589 A | 3/2000 | Giffin, III et al. |

FOREIGN PATENT DOCUMENTS

| | | |
|---|---|---|
| DE | 1108082 | 5/1961 |
| FR | 1274606 | 10/1961 |

OTHER PUBLICATIONS

PT6B–37A Turboshaft, P&WC, 2001, Longueuil, Quebec, Canada.
Customer Training, Engine Familirization, P&WC, 2001, Longueuil, QC, Canada.
PW200 Operation & Technology, P&WC, 2001, Longueuil, Quebec, Canada.
The Natural Evolution, Allison 250–B17F,Allison Gas Turbine Div.Indiana,USA1992.
Turbomeca, Symposium, Mar. 1997.
Allison Gas Turbines, Model 250–C34, Allison Gas Turbine Div. Indiana, USA, 1992.
Model 250–C20B/J Turboshaft Engine, Rolls Royce Corp. Indiana, USA, 2000.

(List continued on next page.)

*Primary Examiner*—Ehud Gartenberg
(74) *Attorney, Agent, or Firm*—Ogilvy Renault

(57) ABSTRACT

A gas turbine engine including a gas generator module and a reduction gearbox module. The gas generator module has an axis which extends longitudinally along a centreline of the gas generator module, and the reduction gearbox module has an axis which extending longitudinally along the centreline of the reduction gearbox and is offset from said generator axis. The reduction gearbox is driven by an intermediate shaft angled relative to the turbine output shaft.

20 Claims, 3 Drawing Sheets

OTHER PUBLICATIONS

PW200 Product Overview, Turboshafts PW200, P&WC, 2001.

PW200 Product Overview, Turboprops PW100, P&WC, 2001.

PW200 Product Overview, Turboshafts PT6T,T400, P&WC, 2001.

PW200 Product Overview, Turboprops, PW100, P&WC, 2001.

PW200 Product Overview, Turboshafts PT6B, P&WC, 2001.

Search Report PCT/CA 02/01709.

* cited by examiner

FIG_2

US 6,735,954 B2

OFFSET DRIVE FOR GAS TURBINE ENGINE

TECHNICAL FIELD

The present invention relates to gas turbine engine design, and in particular, to a gas turbine engine having an offset driven output shaft.

BACKGROUND OF THE INVENTION

Light general aviation aircraft typically employ engine driven propellers to provide forward thrust. Many of these aircraft have been designed to employ internal combustion piston engines, but there is a relatively recent trend toward retrofitting such aircraft with gas turbine engines. However, a seemingly simple obstacle has so far stifled a more universal replacement of piston engines with gas turbines, and the difficulty is purely a matter of space. Piston engines are typically "short and fat", whereas gas turbine engines tend to be relatively "long and thin". Accordingly, most light aircraft designed to employ a piston engine simply do not have the space to readily accommodate a retrofitted gas turbine engine.

A somewhat unrelated matter which occupies turboprop designers is keeping the installation inlet and exhaust losses to a minimum. The rather large gearbox required to reduce the rotational output speed to drive the propeller poses an obstacle which must be negotiated by designers in getting inlet air to the engine and extracting exhaust gas therefrom. A gas path which is long and is not straight suffers significant pressure losses. Long air inlet paths also typically require increased anti-icing protection.

Accordingly, there is a general need for improvements in the design of gas turbine engines, and in particular, to an engine better adapted for retrofitting a piston-powered aircraft.

SUMMARY OF THE INVENTION

It is an object of the present invention to provide an improved gas turbine engine.

It is another object of the present invention to provide a gas turbine engine which is better adapted to retrofitting a piston-powered aircraft.

It is another object of the present invention to shorten and straighten the gas path of a turboprop or turboshaft engine.

Therefore, in accordance with the present invention, there is provided a gas turbine engine comprising a gas turbine engine, comprising a gas generator module having an turbine shaft for providing rotating output power, and a reduction gearbox module having a gearbox input shaft and a main output power shaft, wherein the gearbox input shaft is drivingly connected to an intermediate drive shaft, the intermediate drive shaft being drivingly connected to the turbine shaft, and wherein the intermediate drive shaft is disposed at an angle to the turbine shaft.

There is also provided, in accordance with the present invention, a gas turbine engine comprising a gas turbine engine, comprising a gas generator module, the gas generator module including a compressor portion, a combustor portion, and a turbine portion, and having an turbine shaft for providing rotating output power, and a reduction gearbox module adapted to drivingly connect the gas generator module to an output power shaft, the reduction gearbox module being disposed substantially laterally beside the gas generator module.

There is also provided, in accordance with the present invention, a gas turbine engine comprising a gas generator module having an turbine shaft for providing rotating output power, and a reduction gearbox module adapted to drivingly connect the gas generator module to an output shaft, wherein the reduction gearbox module is drivingly connected to the turbine shaft through a bevel gear on the turbine shaft.

BRIEF DESCRIPTION OF THE DRAWINGS

Further features and advantages of the present invention will become apparent from the following detailed description, in combination with the appended drawings in which.

DETAILED DESCRIPTION OF THE PREFERRED EMBODIMENT

Figure 1:
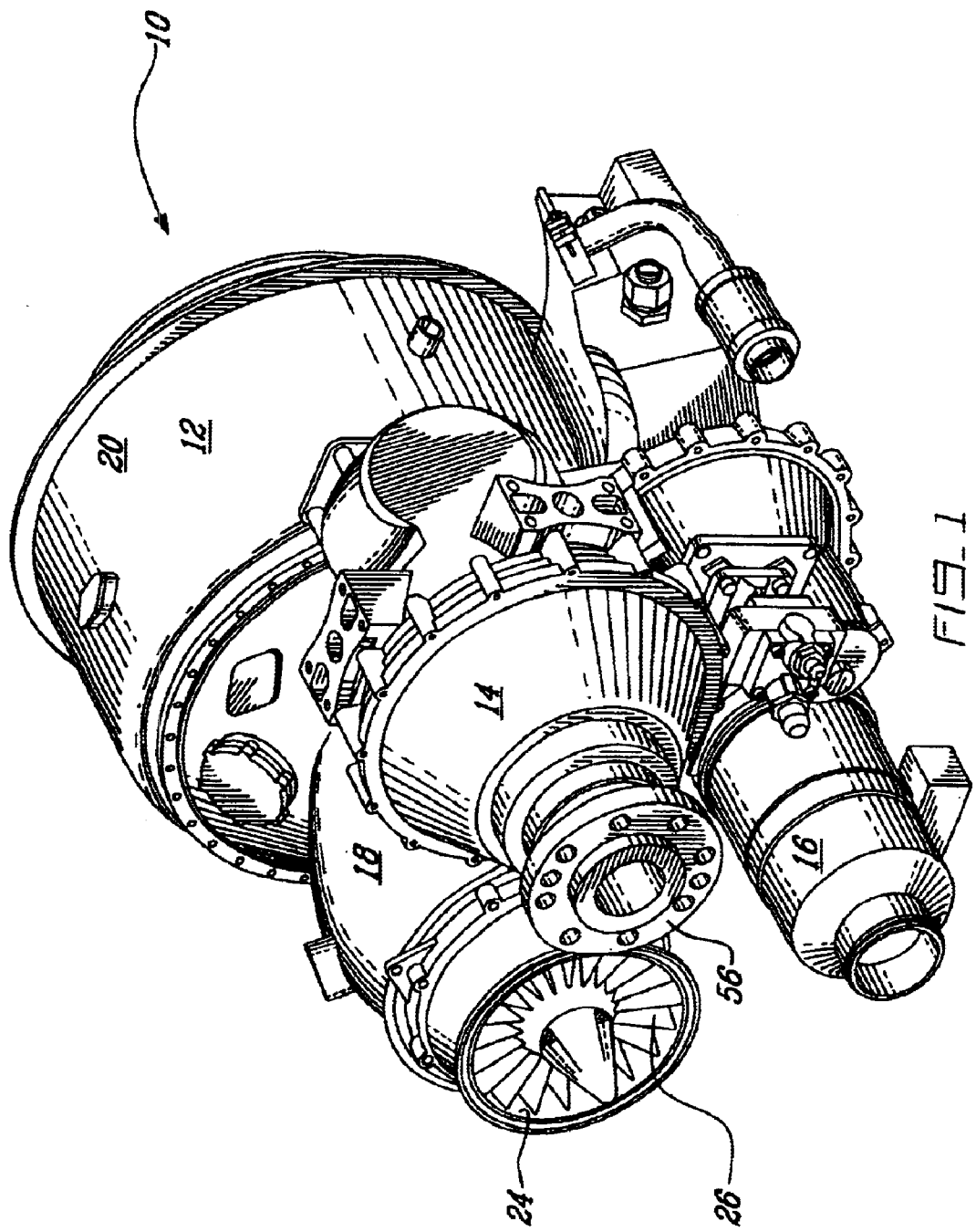
FIG. 1 is an isometric view of a gas turbine engine in accordance with the present invention.
Figure 2:
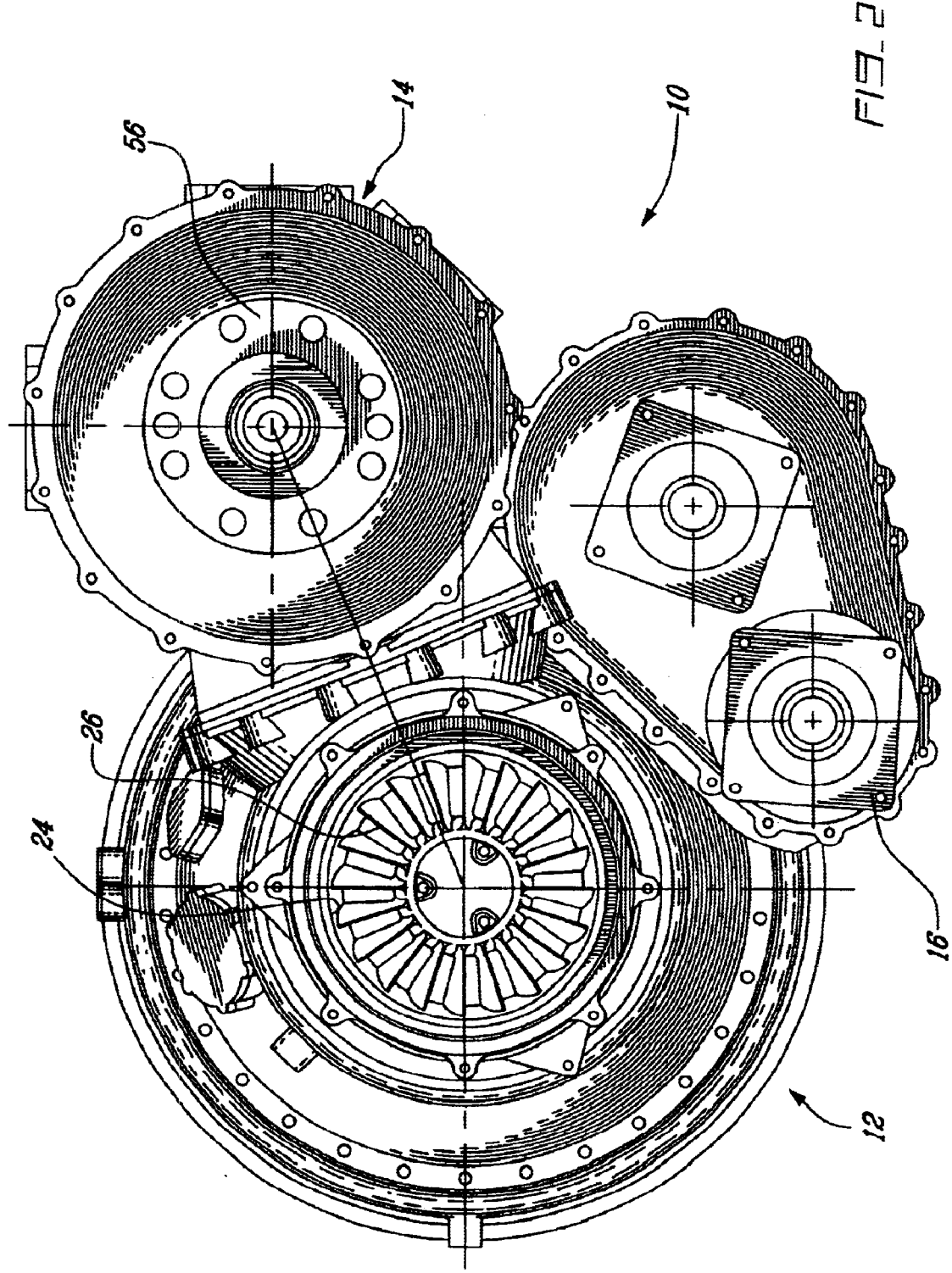
FIG. 2 is a front view of the gas turbine engine of FIG. 1.
Figure 3:
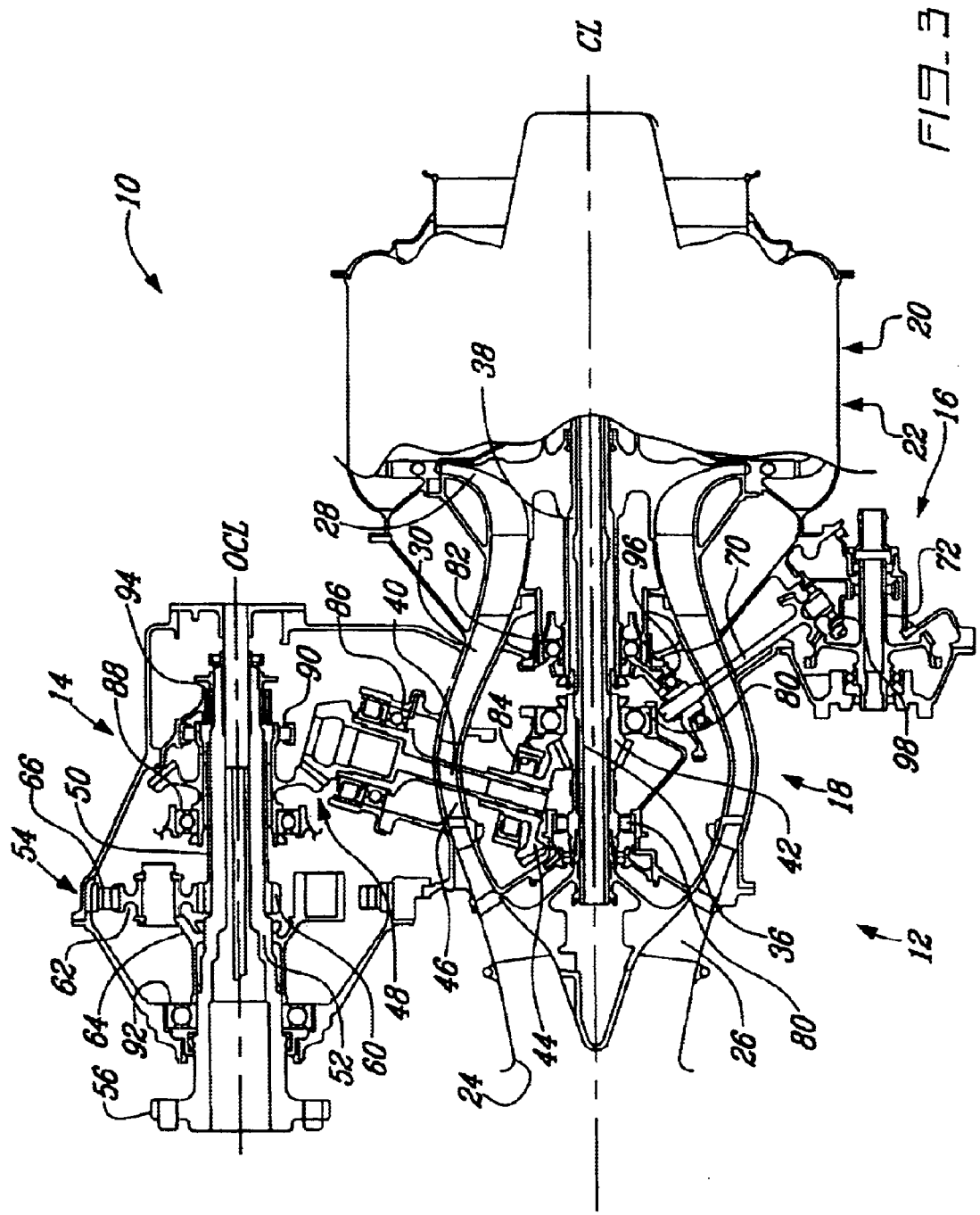
FIG. 3 is a partial cross-sectional view of the gas turbine engine of FIG. 1.

Referring to FIGS. 1 and 2, a turboprop gas turbine engine according to the present invention is shown generally at 10. Engine 10 includes a gas generator module 12, a reduction gearbox module 14 and an accessory gearbox module 16. The gas generator module 12 generally has a compressor portion 18, a turbine portion 20, and a combustor portion 22. These components are all generally symmetrically placed about the centreline CL of gas generator module 12. Referring to FIG. 3, both the reduction gearbox module 14 and the accessory gearbox module 16 are offset from the main engine centreline CL. The offset centreline of the reduction gearbox module 14 is denoted by OCL.

In this embodiment, the compressor portion 18 includes an air inlet 24, a booster stage or boosted rotor type low pressure (LP) compressor 26 (which may be of the type described in co-pending application Ser. No. 09/680281, incorporated herein by reference), and a centrifugal impeller 28 type high pressure (HP) compressor at the outlet end of a compressor air flow duct 30. The air inlet configuration is relatively straight and generally parallel and concentric to each of the centreline axis CL, the compressor portion 18 and the turbine portion 20, as will be discussed further below.

The turbine portion 20 of the gas generator module 12 is typical and generally includes turbine discs (not shown) connected to a set of drive shafts, in this case an inner LP turbine shaft 36 and an outer HP turbine shaft 38. The HP shaft 38 drives the impeller 28, while the LP shaft 36 drives the rotor 26, the reduction gearbox module 14 and the accessory gearbox module 16. One will appreciate, however, that these components may be driven by different shafts.

The reduction gearbox module 14 receives input power from an RGB tower shaft 40 drivingly connected, via bevel gear 42 and bevel gear 44, to the LP shaft 36. The tower shaft 40 extends at an angle to the main centreline CL and LP turbine shaft 36, and in this case is roughly perpendicular thereto. The tower shaft extends through the inlet gas path 30 through a fairing 46. A bevel gear set 48 transfers rotational power to an RGB input shaft 50 which, in turn, drives an RGB output shaft 52 through an epicyclic reduction gear train 54. The output shaft 52 terminates (in this example) in a propeller flange 56 for connection of a suitable propeller (not shown).

The epicyclic reduction gear train 54 is typical and generally includes a central sun gear 60, a plurality of planet gears 62 on a carrier 64, mounted for rotation within a fixed outer ring gear 66. The sun gear 60 is driven by the input shaft 50 and the planet gear carrier 64 drives the output shaft 52.

The accessory gearbox module 16 is driven from the LP shaft 36 via an AGB tower shaft 70. The AGB output shaft 72 is used to drive accessory devices, such as fuel pumps, starter generators, mechanical fuel controls, air/oil separators, and oil pumps, etc.

All rotating shafts are journalled by suitable bearings. Generally, the bearings of this embodiment include LP turbine shaft bearings 80, HP turbine shaft bearings 82, an roller bearing 84 and an ball and roller bearing combination 86 supporting the RGB tower shaft 40, a ball bearing 88 and a roller bearing 90 journalling shaft 50, and a ball bearing 92 and a roller bearing 94 journalling shaft 52. A ball bearing 96 and roller bearing 98 support the AGB tower shaft 70.

In use, the operation of the gas generator 12 causes output rotational power to be delivered by the LP turbine shaft 36. As the LP shaft rotates, which can be at speeds upward of 25,000 to 30,000 RPM, torque is transferred via bevel gear 42 and bevel gear 44, to RGB tower shaft 40, then through bevel gear set 48 to RGB input shaft 50, and through reduction gear train 54 to the RGB output shaft 52. The reduced speed of the output shaft 52 is typically around 2000 RPM, but depends on the application.

While it is known to have turbine engines with reduction gearboxes and output drive shafts-which are offset from the main turbine shaft, such devices typically utilize spur gear trains to drive the output shaft. An example of such a configuration is shown in U.S. Pat. No. 4,825,645. The spur gear drive train, however, poses a large obstacle which must be negotiated by the gas path. In contrast, the shaft 40 of the present invention crosses the gas path relatively unobtrusively, housed in a fairing or other housing. Thus, a relatively simple means of locating the main or reduction gear box laterally beside the gas generator is provided. Also novel in the present inventions is the use of a bevel gear set (i.e. gear 42 and 44) to take power directly from the LP shaft to drive the reduction gear box.

Many gas turbine engines have accessory gearboxes which are offset from the engine centreline. However, the present invention has a reduction gearbox module which is offset from the main centreline, driven by a drive shaft which is angled relative to the main turbine output shaft. This offset permits a substantially more compact design to be achieved, with the overall shape approximating the "short and fat" engine envelopes in aircraft designed to be powered by piston engines. It allows the reduction gearbox to be placed more or less laterally beside the gas generator module, significantly shortening the length of the overall unit.

When the offset centreline OCL of the reduction gearbox is sufficiently offset from the main centreline CL, the gas path is relatively unobstructed by the main gearbox and thus a straighter, 'line-of-sight' inlet air flow is possible. Similarly, the present invention permits a parallel (rather than serial) arrangement of main gearbox and gas generator, which permits the overall length of the gas path to be substantially shortened. The benefits of a shorter, straighter gas path are well known. The straight inlet also allows 'ram' air pressure effect increase the inlet air pressure in the turboprop when in flight, which improves engine output power and performance.

Also, the shorter inlet duct length reduces the area where de-icing is required, and the use of the boosted rotor multiplies the benefit in this respect.

The shaft 40 of the present invention extends at an angle to the main centreline CL (i.e. is not parallel to it), and in this case is almost perpendicular thereto. In fact, in this case, the shaft 40 is canted slightly aft to permit a placement for propeller flange 40 which is as close as possible to inlet duct 24. The relative positioning of the gas generator module 12 and the reduction gearbox module 14 is a matter of design choice, and the amount of offset and the relative angles between the modules may vary, depending on the parameters of the intended application.

Advantageously, the present invention also permits the placement of the engine on the wing to be optimized. Typically, it is desirable to keep the engine relatively low on the wing to reduce losses, however the propeller of course cannot be permitted to touch the ground. The present invention can permit the prop to be positioned higher, relative to the wing, while the engine is kept lower, which is particularly advantageous in low-wing applications.

The offset output drive also permits the propeller in a turboprop application to include a double acting propeller pitch control, which offers an additional weight savings.

The placement of the reduction gearbox module 14 also permits the boosted rotor and high turbine rotor to be removed without disturbing the oil system, which reduces the potential for oil contamination.

The embodiment of the invention described above is intended to be exemplary only. Modifications may be made which do not depart from the spirit and intent of the invention disclosed herein. While a turboprop configuration is described, the design has application to other gas turbine configurations such as turboshafts, for example. The scope of the invention is, therefore, intended to be limited solely by the scope of the appended claims.

We claim:

1. A gas turbine engine comprising:
    a gas generator module having a turbine shaft for providing rotating output power; and
    a reduction gearbox module having a gearbox input shaft and a main output power shaft, wherein the gearbox input shaft is drivingly connected to an intermediate drive shaft, the intermediate drive shaft being drivingly connected to the turbine shaft, and wherein the intermediate drive shaft is disposed at an angle to the turbine shaft.

2. The gas turbine engine as defined in claim 1, wherein the main output power shaft is laterally offset from the turbine shaft.

3. The gas turbine engine as defined in claim 1, wherein the gas generator module has an inlet air path, and wherein the inlet air path is substantially straight and substantially unobstructed by the reduction gearbox module.

4. The gas turbine engine as defined in claim 1, wherein the gas generator module has an inlet air path, and wherein the inlet air path is substantially parallel to a longitudinal axis of the gas generator module.

5. The gas turbine engine as defined in claim 1, wherein the turbine shaft and the gearbox input shaft are substantially parallel.

6. The gas turbine engine as defined in claim 1, wherein the turbine shaft includes a bevel gear adapted to rotatingly drive the intermediate shaft.

7. The gas turbine engine as defined in claim 1, wherein the reduction gearbox module has shaft speed reduction means operatively interposed between the gearbox input shaft and the main output power shaft.

8. The gas turbine engine as defined in claim 1, wherein the intermediate drive shaft extends generally perpendicularly to the turbine shaft.

9. The gas turbine engine as defined in claim 1, wherein main output power shaft is adapted to permit a propeller to be mounted thereto.

10. A gas turbine engine comprising:
a gas generator module, the gas generator module including a compressor portion, a combustor portion, and a turbine portion; and
a reduction gearbox module adapted to drivingly connect the gas generator module to an output power shaft, the reduction gearbox module being disposed substantially laterally beside the gas generator module.

11. The gas turbine engine as defined in claim 10, wherein the gas generator module and the reduction gearbox module are drivingly connected by an intermediate shaft, and wherein the intermediate shaft is disposed at an angle to a longitudinal axis of the gas generator.

12. The gas turbine engine as defined in claim 11, wherein the intermediate shaft is drivingly connected by a bevel gear set to a turbine shaft of the turbine module.

13. The gas turbine engine as defined in claim 11, wherein the intermediate drive shaft extends generally perpendicularly to the turbine shaft.

14. The gas turbine engine as defined in claim 10, wherein the gas generator module has an inlet air path, and wherein the inlet air path is substantially straight and substantially unobstructed by the reduction gearbox module.

15. The gas turbine engine as defined in claim 10, wherein the gas generator module has an inlet air path, and wherein the inlet air path is substantially parallel to a longitudinal axis of the gas generator module.

16. The gas turbine engine as defined in claim 1, wherein the reduction gearbox module is adapted to permit a propeller to be mounted thereto.

17. A gas turbine engine comprising:
a gas generator module having an turbine shaft for providing rotating output power; and
a reduction gearbox module adapted to drivingly connect the gas generator module to an output shaft,
wherein the reduction gearbox module has an input shaft which is drivingly connected to an output turbine shaft of the gas generator module through a bevel gear on the turbine shaft.

18. The gas turbine engine as defined in claim 17, wherein an intermediate shaft is operatively interposed between the reduction gearbox module input shaft and the turbine shaft bevel gear.

19. The gas turbine engine as defined in claim 18, wherein the intermediate shaft is disposed at an angle to the turbine shaft.

20. The gas turbine engine as defined in claim 18, wherein the gas generator module has front portion which is substantially aligned with a front portion of the reduction gearbox module.

* * * * *